United States Patent Office 2,702,273
Patented Feb. 15, 1955

2,702,273

PRODUCTION OF ORGANIC SULPHONIC ACIDS

Gordon Telford Kennedy, deceased, late of Ruabon, North Wales, by Helen Muriel Kennedy, Hounslow, and Jean Frances Kennedy, Willesden, England, administratrices, assignors, by mesne assignments, to Monsanto Chemicals Limited, London, England, a British company No Drawing. Application December 1, 1950, Serial No. 198,738

Claims priority, application Great Britain December 6, 1949

16 Claims. (Cl. 204—158)

This invention relates to the production of organic sulphonic acids, especially sulphonic acids derived from higher molecular weight hydrocarbons and suitable in the form of their sodium and similar salts for use as detergents and other surface-active agents.

It is known that organic sulphonic acids can be obtained by the action of a mixture of sulphur dioxide and oxygen on certain liquid hydrocarbons in the presence of ultraviolet rays, whereby a photochemical reaction takes place and one or more sulphonic acid groups are introduced into the hydrocarbon molecule. In order to obtain the best results it is in practice desirable for the hydrocarbon to be aliphatic in character, saturated and free from branched chains, and the reaction takes place readily with saturated straight-chain aliphatic hydrocarbons and saturated cyclo-aliphatic hydrocarbons free from branched chains. By using a saturated straight-chain aliphatic hydrocarbon containing a long carbon chain, for instance from twelve to twenty carbon atoms, or a mixture of such hydrocarbons, a product can be obtained which in the form of its sodium salt is an efficient surface-active agent. The sodium salts from hydrocarbons of this type containing from say thirteen to sixteen carbon atoms are in particular good detergents.

This process is of limited commercial value owing to the high intensity of the ultraviolet radiation which is needed, a radiation in the ultraviolet apparently being essential for the reason that the reactants show little absorption in the visible spectrum. As a consequence attempts have been made to bring about the reaction without adopting photochemical means, and this has been achieved by using acetic anhydride as a catalyst, in which case the acetic anhydride and the sulphonic acid produced form a complex which needs to be decomposed in a subsequent operation. As might therefore be expected, this modified process while of greater commercial value is less convenient to operate than the photochemical process.

It is an object of this invention to provide a new process for preparing organic sulphonic acids. It is a particular object of this invention to provide an improved photochemical process for preparing organic sulphonic acids. Other objects will become apparent hereinafter.

According to the present invention, a method has now been found of bringing about the photochemical reaction between hydrocarbons, sulphur dioxide and oxygen to form organic sulphonic acids far more readily, and moreover under conditions in which ultraviolet radiation is no longer necessary (though it can be used if desired) and visible radiation is sufficient.

It has in fact been found that greatly improved results are obtained if a quantity of chlorine is used in conjunction with the sulphur dioxide and oxygen, and moreover that the presence of the chlorine makes it no longer necessary to use ultraviolet radiation. The radiation can be either in the visible spectrum or in the ultraviolet, provided the wavelength is such that the radiation is absorbed by the chlorine. The explanation appears to be that chlorine has a substantial absorption in the visible spectrum and is for this reason capable of promoting the photochemical reaction with radiation of a wavelength longer than the ultraviolet. The wavelength is by no means critical provided the radiation is absorbed, and it would appear in general that visible light of a wavelength less than about 5,000 Angstrom units has a photochemical effect, though of course light of some wavelengths is more strongly absorbed by the chlorine than that of other wavelengths and is hence more suitable.

In short the chlorine sensitizes and catalyses the sulphonation reaction, which in its presence proceeds more efficiently and moreover tends to produce lighter-colored products.

According to the invention, therefore, an organic sulphonic acid is produced by sulphonating a hydrocarbon in the liquid phase by means of sulphur dioxide and oxygen in the presence of chlorine as catalyst and using visible or ultraviolet radiation of such a wavelength that it is adequately absorbed by virtue of the presence of the chlorine.

If, as will usually be the case, the hydrocarbon is one which is liquid at ordinary temperatures it is sufficient to pass the gases into the liquid hydrocarbon as described in the following paragraphs. If a solid hydrocarbon is to be treated it can be used in solution in a suitable solvent, and this is included where it is stated that the hydrocarbon is in the liquid phase. In any event, the reaction can usually be carried out simply by passing a mixture of sulphur dioxide, oxygen and chlorine into the hydrocarbon at ordinary temperatures, or slightly above, illuminated from a source of visible or ultraviolet rays, and it is often found that the reaction mixture then separates during the course of the process into two layers, the lower of which consists essentially of the sulphonic acid product. The source of the radiation may be of any convenient character, such as a mercury arc lamp or a tungsten filament lamp; in certain of the examples given later in this specification a mercury arc lamp was used with filters passing a narrow wavelength band. The mechanism of the reaction appears to be that the chlorine absorbs the radiation with the formation of atomic chlorine, which then acts as initiator in the reaction, and any radiation which causes dissociation of the chlorine will apparently give the desired result. This can be achieved by visible light as far as the green, though wavelengths lower in the visible or perhaps in the ultraviolet are preferable in that such wavelengths are more strongly absorbed by chlorine.

The sulphur dioxide and oxygen are preferably used in the ratio of two to one by weight. The quantity of chlorine used as catalyst is not critical, except that it is desirable not to use a quantity larger than is necessary in order to reduce any direct chlorination of the hydrocarbon to a minimum. This invariably occurs as a side-reaction and of course it results in a lower yield of the sulphonic acid product, so that in practice there is an optimum chlorine usage beyond which it is undesirable to go on account of this side-reaction. It is to be observed that in some instances the reaction once initiated in the manner described will continue without the further supply of chlorine (and even without continued radiation), so that after initiation the chlorine can be cut off and only sulphur dioxide and oxygen supplied. This is apparently due to the fact that on initiation of the reaction a peroxy compound is formed which in some instances remains and has a catalytic effect. If the process can be carried out in this way by stopping the supply of chlorine once the reaction has started, this will reduce the extent to which any direct chlorination of the hydrocarbon takes place and is hence to be preferred. The process can be carried out in this manner without difficulty when low molecular weight hydrocarbons are being treated, but the higher the molecular weight of the hydrocarbon, the greater in general seems to be the need to continue the supply of chlorine throughout the process. A continuing supply of chlorine is in fact often unavoidable with hydrocarbons of a molecular weight such that products can be obtained suitable for use in the production of surface-active agents, though Example 6 among those given later in this specification actually describes an experiment using n-dodecane in which the sulphonation was made to continue after initiation without the continued supply of chlorine.

In some instances the supply of chlorine at intervals is useful.

As indicated above, the quantity of chlorine used should preferably be kept as low as reasonably possible consistent with a sufficiently high reaction velocity, and a quantity up to a few percent of the weight of the sulphur dioxide and oxygen is usually suitable, say about 2% (though wide variations are possible). If the chlorine is to be introduced only at the beginning of the operation it is possible to use quite large quantities for a short time in order to start the reaction effectively, and this is in fact illustrated in Example 6 given below.

The process can be carried out successfully with low molecular weight hydrocarbons such as n-heptane and cyclohexane, and also with higher molecular weight hydrocarbons. As indicated earlier in this specification, saturated straight-chain aliphatic hydrocarbons containing from twelve to twenty carbon atoms are particularly suitable when sulphonic acids are required suitable for use in preparing surface-active agents (or containing from thirteen to sixteen carbon atoms when detergents are to be prepared). Mixtures of suitable higher molecular weight hydrocarbons would probably be used in practice in carrying out the process for this purpose, and such mixtures can for instance be obtained from the Fischer-Tropsch process. Another source is the kerosenes, from which the saturated straight-chain hydrocarbons can if desired be extracted before sulphonation. Thus they may be extracted by the urea method, in which the kerosene dissolved in an organic solvent is treated with an aqueous solution of urea in order to form an additional product of urea with the saturated straight-chain hydrocarbons, and this addition product is then separated and decomposed.

The invention is illustrated by the following examples:

*Example I*

A quantity of 200 grams of n-heptane was introduced into a Pyrex flask, and sulphur dioxide, oxygen and chlorine were passed simultaneously into the n-heptane at the rate of 0.3, 0.15 and 0.008 gram per minute respectively. The flask was illuminated from the outside by a mercury arc lamp, and its contents were maintained at 30±5° C. using external cooling. Part of the radiation was of course absorbed by the Pyrex glass. After three hours there had been a weight increase of about 30 grams, and the product consisted of two layers, the bottom one being 57 grams of a light-yellow viscous oil of specific gravity 1.2, and the top one being unreacted n-heptane containing a small proportion of chlorinated material. Approximately one-third of the chlorine had reacted, the other two-thirds passing through with excess sulphur dioxide and oxygen.

The bottom layer consisted approximately of 90% of n-heptane mono-sulphonic acids, 7% of sulphuric acid and 3% of unreacted n-heptane in solution.

When the reaction was carried out without the use of chlorine, only a trace of a very dark-colored oil (less than 2 cc.) had collected at the bottom of the flask after the three hours.

The mercury arc lamp used in this and certain of the following examples was a 125 watt Osira lamp.

*Example II*

Example I was repeated using cyclohexane instead of n-heptane.

After three hours the bottom layer, a pale yellow oil, was freed from excess sulphur dioxide and dissolved cyclohexane by placing it under reduced pressure, and then consisted of 30 grams of a clear viscous oil containing approximately 89% of cyclohexane mono-sulphonic acid and 11% of sulphuric acid. The former crystallized on standing, and more easily so after the addition of a little water. After recrystallization from alcohol it then gave white crystals analyzing by titration as the monohydrate $C_6H_{11}SO_3H.H_2O$.

*Example III*

Example I was repeated using illumination from a 150 watt tungsten filament lamp instead of from a mercury arc lamp. The radiation from the lamp was of course primarily in the visible spectrum.

After two and a half hours 40 grams of bottom layer had collected, having a composition similar to that described in Example I.

*Example IV*

Example III was repeated except that the chlorine was introduced only during the first ten minutes of the reaction and again for ten minutes after one hour had elapsed from the start. The illumination was cut off after two hours from the start of the reaction.

The absorption of sulphur dioxide and oxygen continued in the absence of the chlorine and also after the illumination had been stopped. After a total of five hours the bottom layer amounted to 30 grams and had a composition similar to that of the bottom layer in Example I.

*Example V*

Example III was repeated except that the chlorine was introduced and the illumination continued only during the first ten minutes of the reaction.

Again the absorption of sulphur dioxide and oxygen by the n-heptane continued in the presence of the chlorine and after the illumination had been stopped. A sulphonation produced similar to that of Example I was obtained.

*Example VI*

10 cc. of n-dodecane were introduced into a Pyrex vessel, and sulphur dioxide, oxygen and chlorine were passed simultaneously into the n-dodecane at rates of 0.3, 0.15 and 0.09 gram per minute respectively, the reaction mixture being maintained at 30±5° C. using external cooling. The vessel was illuminated from the outside by radiation from a mercury arc lamp through filters which restricted the radiation to a narrow wavelength band of about 4,360 Angstrom units.

After five minutes the supply of chlorine and the radiation were both stopped, and the sulphur dioxide and oxygen supply was continued alone. The reaction was then followed by measuring the volume of sulphur dioxide and oxygen mixture which was absorbed. The rate of gas absorption rose during fifteen minutes to a maximum of 0.25 cc. per second (measured at atmospheric pressure), after which it fell slowly to zero. After a total of twenty-five minutes from the start of the experiment both the volume of gas absorbed and the sulphonic acid content of the reaction mixture indicated that about 15% of the n-dodecane had been sulphonated (assuming that the product was the mono-sulphonic acid).

In this instance two layers were produced as before, but owing to the solubility of the sulphonic acid produced in n-dodecane the hydrocarbon layer contained a considerable amount of the product.

*Example VII*

Example VI was repeated using n-tetradecane instead of n-dodecane, and using a sulphur dioxide, oxygen and chlorine flow of 0.3, 0.15 and 0.007 gram per minute respectively. In this instance the chlorine flow and the radiation were continued throughout the experiment.

After two hours it was found that there had been a conversion of the n-tetradecane to sulphonic acid (assuming that the product was the mono-sulphonic acid) of about 8%, and in addition about 4% of the n-tetradecane had been converted to chloride or sulphonyl chloride by direct chlorination or by sulphochlorination.

By treating the product (after removal of dissolved gases under vacuum) with dry ammonia the ammonium salt of n-tetradecane sulphonic acid could be obtained as a sticky white solid having surface-active properties.

*Example VIII*

10 cc. of a mixture of Fischer-Tropsch hydrocarbons having a boiling range of 235–280° C. were introduced into a Pyrex vessel, and sulphur dioxide, oxygen and chlorine were passed simultaneously into the mixture for a period of one hour, using a gas flow of 0.3, 0.15 and 0.007 gram per minute respectively. The mixture was as before maintained at a temperature of 30±5° C., and the vessel was illuminated as described in Example VI.

At the end of the hour about 10% conversion to sulphonic acid had taken place, calculated as mono-sulphonic acid as before.

What is claimed is:

1. In the method for producing an organic sulphonic acid by the reaction of a saturated hydrocarbon with sulfur dioxide and oxygen, the improvement comprising the direct formation of the sulphonic acid by carrying out the reaction between reactants consisting of the saturated hydrocarbon in the liquid phase, oxygen and sulfur dioxide, and at least for a substantial initial duration of the reaction in the presence of radiation of a wave length of less than 5000 Angstrom units and in the presence of about 2% by weight of chlorine based on the sum of the weights of sulfur dioxide and oxygen employed.

2. A process as defined in claim 1 wherein the radiation is of wave length less than 5000 Angstrom units and the addition of chlorine is intermittent but does not exceed a total of more than about 2% by weight of the sum of the weights of sulfur dioxide and oxygen employed.

3. A process as defined in claim 1 wherein the radiation is of a wave length less than about 5000 Angstrom units and the addition of chlorine is continuous but does not exceed a total of more than about 2% by weight of the sum of the weights of sulfur dioxide and oxygen employed.

4. A process as defined in claim 1 wherein the hydrocarbon is a saturated straight chain aliphatic hydrocarbon.

5. A process as defined in claim 1 wherein hydrocarbon is a saturated cyclo-aliphatic hydrocarbon free from branched chains.

6. A process as defined in claim 1 in which the hydrocarbon is one which is liquid at ordinary temperatures.

7. A process according to claim 1 in which a saturated straight-chain aliphatic hydrocarbon containing from twelve to twenty carbon atoms is used.

8. A process according to claim 1 in which a saturated straight-chain aliphatic hydrocarbon containing from thirteen to sixteen carbon atoms is used.

9. A process according to claim 1 in which a hydrocarbon mixture obtained from the Fischer-Tropsch process is used.

10. A process according to claim 1 in which a hydrocarbon mixture obtained from kerosene is used.

11. A process according to claim 1 in which visible radiation of shorter wavelengths than the green is used.

12. A process consisting of reacting a saturated hydrocarbon in the liquid phase with the reactants consisting of oxygen and sulfur dioxide, and at least for a substantial initial duration of the reaction in the presence of radiation in the visible range of a wave length less than about 5000 Angstrom units and in the presence of chlorine introduced into said reaction in the amount up to a total of about 2% by weight based on the sum of the weights of sulfur dioxide and oxygen employed thereby producing an organic sulphonic acid direct, and removing said sulphonic acid from the resulting reaction mixture.

13. A process for the direct production of n-heptane sulphonic acid consisting of passing into n-heptane in the liquid phase the reactants consisting of sulfur dioxide and oxygen, at least for a substantial initial duration of the reaction in the presence of radiation in the visible range of a wave length of less than about 5000 Angstrom units and in the presence of an amount of chlorine up to a total of about 2% by weight based on the sum of the weights of sulfur dioxide and oxygen employed, and removing the resulting n-heptane sulphonic acid from the reaction mixture.

14. A process for the direct production of cyclohexane sulphonic acid consisting of passing into cyclohexane in the liquid phase the reactants consisting of sulfur dioxide and oxygen, at least for a substantial initial duration of the reaction in the presence of radiation in the visible range of a wave length of less than about 5000 Angstrom units and in the presence of an amount of chlorine up to a total of about 2% by weight based on the sum of the weights of sulfur dioxide and oxygen employed, and removing the resulting cyclohexane sulphonic acid from the reaction mixture.

15. A process for the direct production of n-dodecane sulphonic acid consisting of passing into n-dodecane in the liquid phase the reactants consisting of sulfur dioxide and oxygen, at least for a substantial initial duration of the reaction in the presence of radiation in the visible range of a wave length of less than about 5000 Angstrom units and in the presence of an amount of chlorine up to a total of about 2% by weight based on the sum of the weights of sulfur dioxide and oxygen employed, and recovering the resulting n-dodecane sulphonic acid from the reaction mixture.

16. A process for the direct production of n-tetradecane sulphonic acid consisting of passing into n-tetradecane in the liquid phase the reactants consisting of sulfur dioxide and oxygen, at least for a substantial initial duration of the reaction in the presence of radiation in the visible range of a wave length of less than about 5000 Angstrom units and in the presence of an amount of chlorine up to a total of about 2% by weight based on the sum of the weights of sulfur dioxide and oxygen employed, and recovering the resulting n-tetradecane sulphonic acid from the reaction mixture.

References Cited in the file of this patent

UNITED STATES PATENTS

| Number | Name | Date |
|---|---|---|
| Re. 20,968 | Reed | Jan. 3, 1939 |
| 2,046,090 | Reed | June 30, 1936 |
| 2,061,617 | Downing et al. | Nov. 24, 1936 |
| 2,174,110 | Reed | Sept. 26, 1939 |
| 2,202,791 | Fox et al. | May 28, 1940 |
| 2,412,909 | Potter | Dec. 17, 1946 |
| 2,434,746 | Ross et al. | Jan. 20, 1948 |